US011491714B2

(12) United States Patent
Van Brocklin et al.

(10) Patent No.: US 11,491,714 B2
(45) Date of Patent: Nov. 8, 2022

(54) SUPPORT STRUCTURES AND INTERFACES

(71) Applicant: HEWLETT-PACKARD DEVELOPMENT COMPANY, L.P., Spring, TX (US)

(72) Inventors: Andrew L. Van Brocklin, Corvallis, OR (US); James P. Shields, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/607,469

(22) PCT Filed: Apr. 27, 2018

(86) PCT No.: PCT/US2018/029968
§ 371 (c)(1),
(2) Date: Oct. 23, 2019

(87) PCT Pub. No.: WO2019/209339
PCT Pub. Date: Oct. 31, 2019

(65) Prior Publication Data
US 2021/0331381 A1  Oct. 28, 2021

(51) Int. Cl.
*B29C 64/153* (2017.01)
*B33Y 10/00* (2015.01)
*B33Y 50/02* (2015.01)
*B29C 64/393* (2017.01)
*B29C 64/165* (2017.01)
(Continued)

(52) U.S. Cl.
CPC ............ *B29C 64/153* (2017.08); *B22F 10/10* (2021.01); *B22F 10/40* (2021.01); *B29C 64/165* (2017.08); *B29C 64/393* (2017.08); *B33Y 10/00* (2014.12); *B33Y 50/02* (2014.12)

(58) Field of Classification Search
CPC ... B29C 64/153; B29C 64/165; B29C 64/393; B33Y 10/00; B22F 10/10; B22F 10/40
See application file for complete search history.

(56) References Cited

U.S. PATENT DOCUMENTS

| 5,503,785 A | 4/1996 | Crump et al. |
| 8,318,076 B2 | 11/2012 | Wang et al. |
| 2014/0030487 A1 | 1/2014 | Boyce et al. |

(Continued)

FOREIGN PATENT DOCUMENTS

| JP | 2009139599 A | 6/2009 |
| WO | WO2016073409 A1 | 5/2016 |
| WO | WO2017014785 A1 | 1/2017 |

*Primary Examiner* — Michael P Wieczorek
(74) *Attorney, Agent, or Firm* — HP Inc. Patent Department

(57) ABSTRACT

According to one example there is provided a non-transitory computer readable storage medium comprising instructions that, when executed by a processor, cause the processor to: obtain an object model; analyse the object model; obtain characteristics of an interface agent; generate a modified object model comprising a support structure and an interface between the support structure and the object, the interface being such that after generation of a 3D printed green part and after sintering thereof, the support structure may be released with a predetermined force; and controlling a 3D printer to generate a 3D printed green part based on the modified object model.

19 Claims, 6 Drawing Sheets

(51) Int. Cl.
*B22F 10/10* (2021.01)
*B22F 10/40* (2021.01)

(56) References Cited

U.S. PATENT DOCUMENTS

| | | |
|---|---|---|
| 2016/0207112 A1 | 7/2016 | Pallari |
| 2017/0173697 A1 | 6/2017 | Myerberg et al. |
| 2017/0266882 A1 | 9/2017 | Yan et al. |
| 2017/0297106 A1* | 10/2017 | Myerberg ............... B29C 64/20 |

* cited by examiner

SUPPORT STRUCTURES AND INTERFACES

BACKGROUND 3D printing, or additive manufacturing, techniques can be used to produce objects having complex geometries in a wide-range of materials including thermoplastics, polymers, ceramics, and metal.

Powder-bed 3D printing techniques form a layer of a typically particulate or powder-based build material, and then selectively solidify portions of each formed layer to build up layers of a 3D object being generated.

Metal objects may be generated, for example, by applying a liquid binder agent to portions of a formed layer of metal particulate build material to bind together those portions of build material corresponding to a layer of a 3D object being generated. The binder agent may be cured, for example using heat and/or ultra violet energy. Such techniques are commonly known as binder jetting.

The completed bound object, known commonly as a 'green part', may then be placed into a sintering furnace where the green part is heated to cause the metal build material to sinter and fuse together to form a highly dense metal sintered object. During the sintering phase the binder agent may burn off leaving little or no trace in the sintered object.

During the sintering phase, portions of the object may be subject to sagging or other deformation. It is thus common to add support structures to the object during the generation of the green part to provide support to the object during the sintering phase.

BRIEF DESCRIPTION

Examples will now be described, by way of non-limiting example only, with reference to the accompanying drawings, in which.

DETAILED DESCRIPTION

Figure 1:
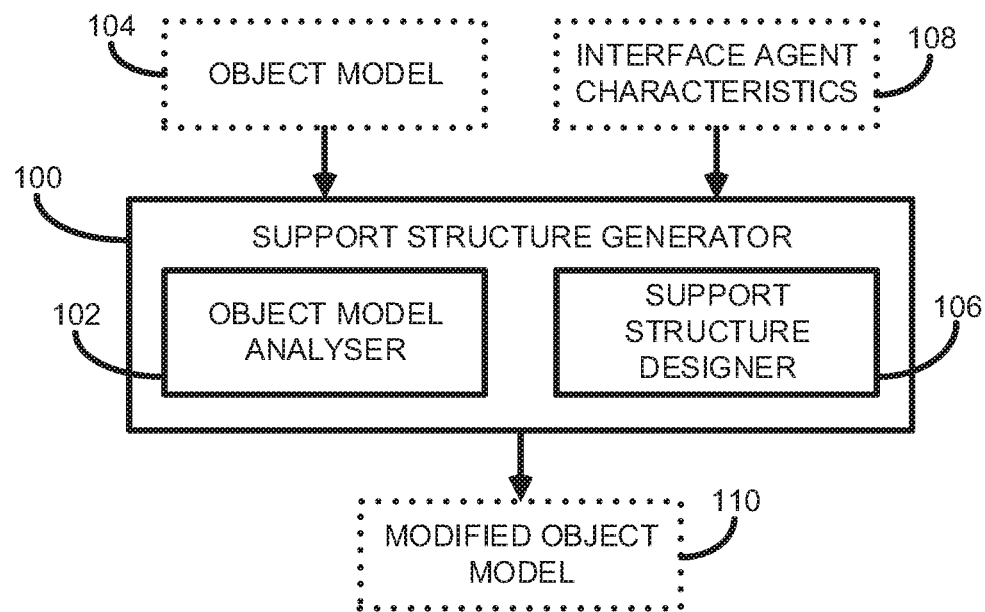
FIG. 1 is a block diagram of a support structure generator according an example.

To add support structures to a green part, a software application may be used to analyse the object model of an object to be generated and, based on the geometry of object to be generated and an intended orientation of the object during the sintering phase, may calculate the position, geometry, and number of support structures to be added to the object model. Such software applications may employ, for example, a physics-based model analysis.

The modified object model, defining both the object to be formed and any support structures, is used by a 3D printer to generate, on a layer-by-layer basis, a green part comprising the object and the support structures. For example, a 3D printer may be controlled, based on slices of the modified object model, to apply a binder agent on portions of each layer of formed build material corresponding to layers of the object and/or support structures to be generated. Since each layer is formed of the same build material, both the object and the support structures will have the same composition.

Support structures formed as part of the green part have to be removed from a sintered object. Typically, the removal of support structures is performed manually by a user, for example using a hand tool such as a pair of pliers or wire cutters. However, if the support structures are formed entirely of the build material it may be difficult to remove the support structures cleanly from the sintered object. This then leads to additional manual processing steps to be performed on the sintered object, for example, to machine or file remnants of removed support structures. It should be noted that use of the terms 'after sintering' or 'sintered' are to be generally understood herein to mean after sintering and after a cooling phase, for example whereby the temperature of a sintered object may be below a temperature at which the sintered object has a high degree of structural integrity. For some build materials this may be at a temperature below about 100 degrees Celsius, although it may be higher or lower for other types of build material.

To assist in the removal of support structures an interface agent may be used during generation of the green part. An interface agent may lead to the creation of a modified region, or interface, between the sintered object and a sintered support structure that allows the support structure to be removed from a sintered object in a cleaner manner compared to not using an interface agent.

Depending on the type of interface agents used the physical properties of the interface may differ. For example, some interface agents may comprise ceramic nanoparticles that cause a weak interface between the sintered object and the support structure. Other interface agents may comprise chemical agents that form, during the sintering phase, gas pockets between the sintered object and the support structure, thereby forming a weak interface between the sintered object and the support structure. Although the term 'weak interface' is used, it will be understood that the support structure is, nonetheless, sufficiently bonded to the object to provide sufficient support to the object during a sintering phase, whilst allowing the support structure to be removed, at the interface, after sintering.

Depending on the composition of the interface agent, the interface agent may be applied along with a binder agent on a portion of a layer of build material that is to form the interface between a sintered object and a support structure. This may be the case, for example, where the interface agent does not comprise any binder agents or does not itself perform an adequate binding function. In some examples, an interface agent may, however, comprise binder agent or binder agent components, and may thus perform an adequate binding function. An example of a suitable interface agent and an example of a suitable binder agent is given further below.

Examples described below provide a system and method of generating support structures for a green part in which the force needed to release each support structure from a sintered object at the interface is predetermined, or is within a predetermined range. In one example a predetermined force may be considered to be a force that is within a range of about +/−10%, or +/−20%, or +/−30%, or +/−40%, or +/−50%, of the predetermined force. In some examples, where a sintered object comprises multiple support structures, the system and method generate support structures which may each be removed from a sintered object when a predetermined release force is applied towards an extremity of a support structure. In this case, the length of the support structures, and hence the effect of mechanical advantage (or leverage), may be taken into account when determining the predetermined release force for each support structure.

Such an approach may be particularly useful when removal of support structures is performed by automated, or semi-automated means. As the volume of sintered objects increases there are significant benefits in streamlining the production of such objects.

Such an approach may also, for example, allow easy removal of support structures using a brush, comb, or other tool having elements having a predetermined resistance greater than the predetermined release force. Furthermore, if the predetermined release force is less than the force that would be required to damage the smallest or weakest feature of the sintered object, removal of the support structures may be performed with such a tool without damaging the sintered object.

Referring now to FIG. 1, there is shown a block diagram of a support structure generator 100 according an example. The support structure generator 100 comprises an object model analyser 102 to analyse an object model 104 of an object to generated. The object model analyser 102 may, for example, determine an intended orientation of the object during a sintering phase, and may determine which portions of the object should be supported by a support structure during a sintering phase. In the examples described herein, the orientation of the object models shown in the drawings is taken to be the orientation of the corresponding green parts during a sintering phase.

The support structure generator 100 further comprises a support structure designer 106 to design, based on the object model analysis performed by the object model analyser 102 and on obtained interface agent characteristics 108, appropriate support structures to be added to the object model 104, thereby generating a modified object model 110. The obtained interface agent characteristics 108 are characteristics of an agent that will be used by a 3D printer to generate the interface between object and the support structure.

The modified object model 110 may then be input to a 3D printer, either directly or, for example, via a pre-processing slicer, and will cause the 3D printer to generate a green part comprising the object, one or multiple support structures, and an interface between the object and each support structure. For example, portions of the object model that define a portion of an object or a support structure may cause a printer to generate such portions by applying a binder agent to a portions of a layer of build material. Portions of the object model that define a portion of an interface may cause a printer to generate such portions by applying an interface agent to portions of a layer of build material. After sintering of the green part, the one or multiple support structures may be released from the sintered object using a predetermined force.

Figure 2:
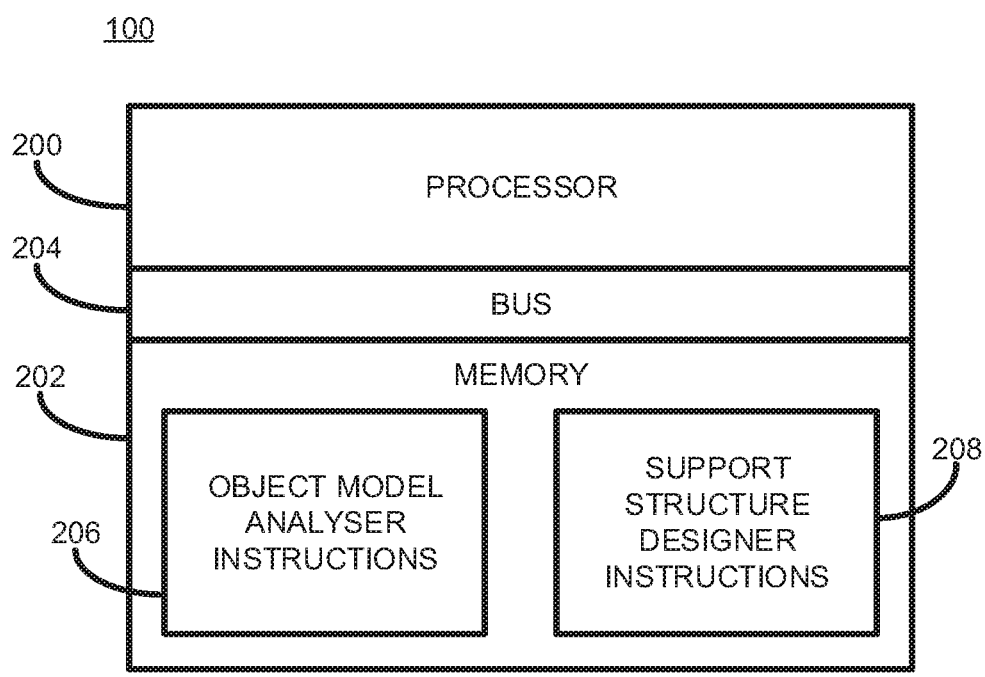
FIG. 2 is a block diagram of a support structure generator according to an example.

In one example, as shown in the block diagram of FIG. 2, the support structure generator 100 may comprise a processor 200, such as a microprocessor or microcontroller. The processor 200 is coupled to a memory 202 by a communications bus 204. The memory 202 stores object model analyser instructions 206 that, when executed by the processor 200, cause the processor to analyse an object model as described herein. The memory 202 additionally stores support structure designer instructions 208 that, when executed by the processor 200, cause the processor to modify an object model to add support structures and interfaces between the support structures and the object model as described herein.

Figure 3:
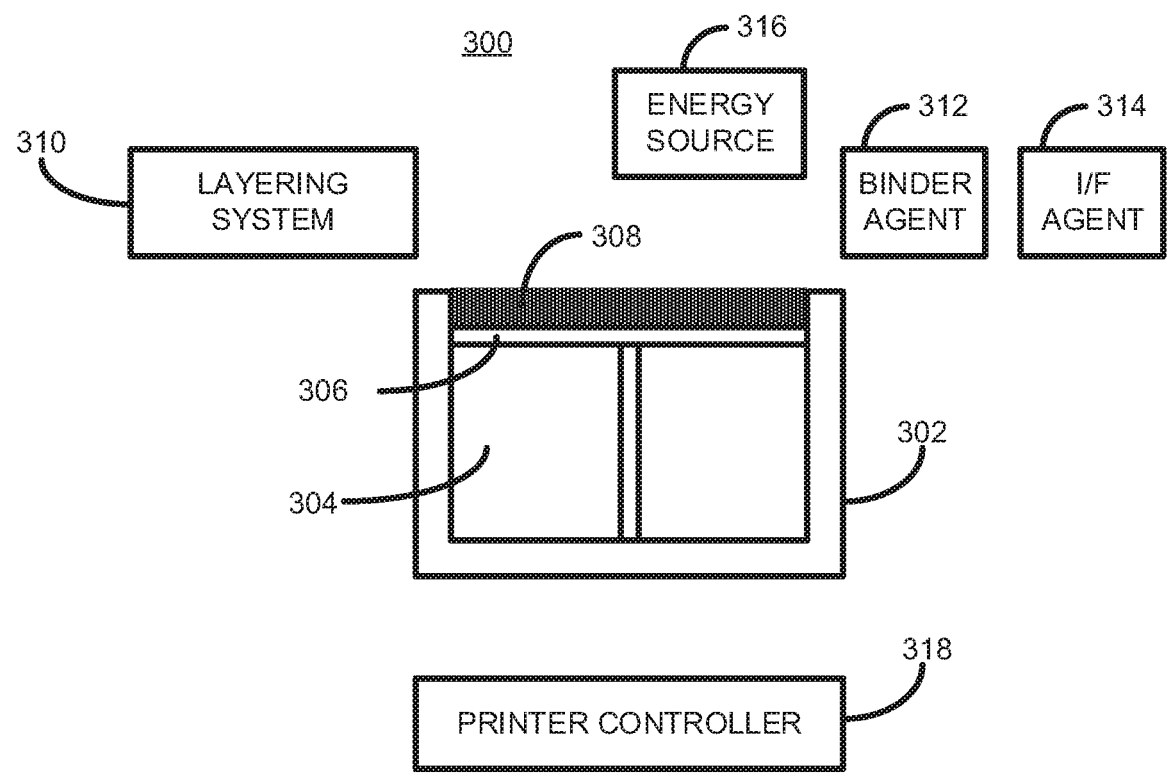
FIG. 3 is a schematic diagram of a 3D printer according to an example.

FIG. 3 is a schematic diagram of an example 3D printer 300 that may be used for generating a green part having a support structure and an interface between the green part and the support structure. The 3D printer 300 is a binder jet type of 3D printer for generating so-called green parts through the application of a chemical binder liquid or agent to successive layers of a particulate build material.

The 3D printer 300 comprises a build chamber 302 in which 3D objects may be generated. In one example, the build chamber 302 is an integral part of the 3D printer 300. In another example, the build chamber 302 is a removable part of the 3D printer 300 and thus may only be present in the printer during a 3D printing operation.

The build chamber 302 defines a build volume 304 in which 3D objects may be generated. A build platform 306 on which 3D objects are generated is movable vertically within the build volume 304. The build platform 306 is initially positioned towards the top of the build volume 304 to allow a layer of build material 308 to be formed thereon by a layering system 310. Once the formed layer of build material has been processed, the build platform 306 may be lowered by a small distance to allow a further layer of build material to be formed atop the previously formed layer. In one example, the build platform 306 may be lowered by a distance of between about 50 to 100 microns, although in other examples it may be lowered by a greater or a smaller distance.

In one example the build material 308 is a metal powder build material, although in other examples other suitable build materials may be used. The build material may be stored, for example, in an internal storage hopper (not shown), or in a removable build material container.

The layering system 310 may comprise, for example, a roller, a wiper, or any mechanism suitable for forming a layer of build material on the build platform 306.

Based on a 3D object model of an object to be generated, the 3D printer 300 selectively applies drops of a liquid binder agent from a binder agent distributor 312 and may selectively apply drops of an interface agent from an interface agent distributor 314. In one example the agent distributors 312 and 314 are inkjet type printheads, such as thermal inkjet or piezo printheads. The binder agent and interface agent may be stored in respective agent containers (not shown) in fluid communication with their respective agent distributors.

In one example, an energy source 316 is provided to dry and/or to cure at least one of the deposited agents.

The elements of the 3D printer 300 are controlled by a printer controller 318 to selectively apply binder agent and interface agent, based on a 3D object model, or data derived therefrom, of an object to be generated, on successively formed layers of build material 408.

Once all layers of the object to be generated have been processed, the formed green part may be removed from the build volume 304. The green part may comprise an object portion and support structures formed by the application of binder agent to the build material, and an interface between the object and each of the support structures formed by the application of at least the interface agent.

Any non-bound powder not forming part of the green part but loosely adhering thereto may be removed, for example through brushing, vacuuming, air blasting, etc. The green part may subsequently be placed in a sintering furnace (not shown) to transform the green part into a sintered object. The sintered object comprises the object to be generated, support structures, and releasable interfaces between the support structures and the object to be generated. The support structures may then be removed using a predetermined force, or predetermined range of forces, to produce the final generated object. In some examples, an additional post-processing process, such as bead-blasting, polishing, or the like, may be performed on the final generated object.

Figure 4:
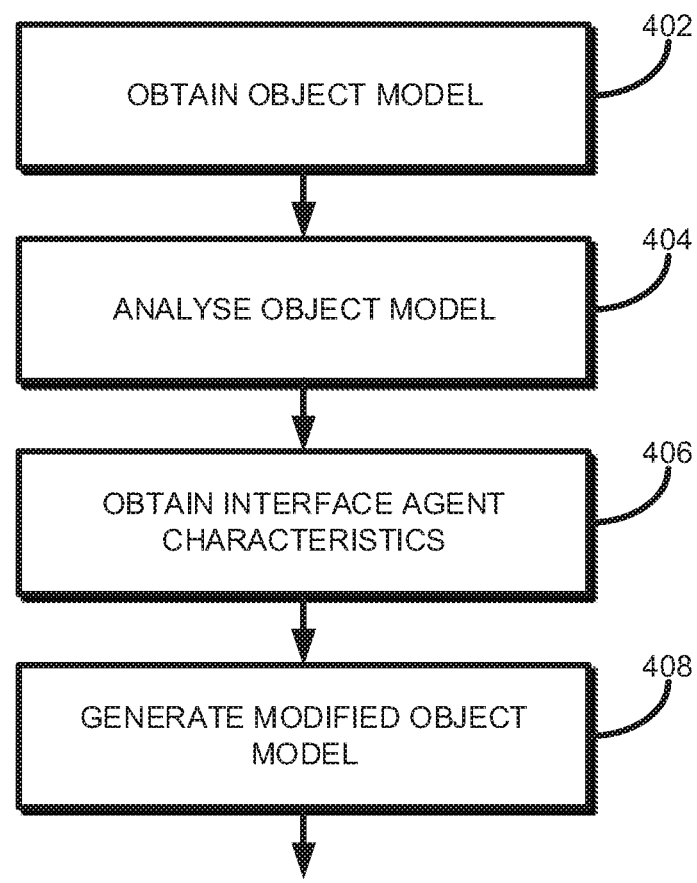
FIG. 4 is a flow diagram outlining a method of operating a support structure generator according to an example.

An example of a more detailed operation of the support structure generator 100 will now be described with additional reference to the flow diagram of FIG. 4 and the FIGS. 5 to 8.

Figure 5A:
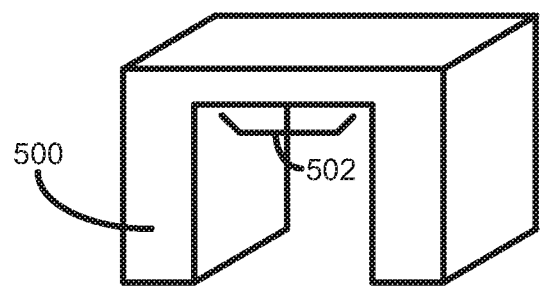
FIG. 5 shows illustrations of an object model and an object model with a support structure and an interface according to an example.

At block 402, the support structure generator 100 obtains an object model 104 of a 3D object to be generated. In this example, the object to be generated is to be generated through use of a 3D printer, such as the 3D printer 300 shown in FIG. 3, and a sintering furnace (not shown). FIG. 5A shows an example object model 104 of an object 500 to be generated.

At block 404, the support structure generator 400 analyses the object model 104 to identify whether there are any portions of the object that may be subject to deformation, such as sagging, during a sintering phase. The analysis may use any suitable analysis techniques, for example a physics-based analysis model, to determine the nature and location of such portions. Such techniques may take into account characteristics that may include one or more of: the type of material in which the object is to be generated; the geometry of the object model such as the thickness of different portions of the object; orientation of the object during a sintering phase; and characteristics of a binder agent to be used in generation of a green part.

As can be seen, the object 500 has a region 502 which has been identified by the support structure analyser 400 as being subject to deformation, such as sagging, during a sintering phase.

At block 406, the support structure generator 400 obtains characteristics 108 of an interface agent to be used during generation of the object 500 by the 3D printer 300. The characteristics 108 may be, for example, based on an interface agent product identification code, be based on data stored on a memory of an interface agent supply container (not shown) inserted into the 3D printer 300, or in any other suitable manner. The interface agent characteristics 108 may define, for example, the strength (or resistance to break) of a support structure interface based on characteristics that may include one or more of: the surface area of the interface, the height of the interface, the type of build material used for the object. For example, for a given build material, the interface agent characteristics may define a shear force required to break, or fracture, the interface per interface surface area, such as 35 N/cm². Such characteristics may be obtained, for example, through prior testing and experiments. The characteristics 108 may be defined in a look-up table, algorithmically, or in any other suitable manner.

For example, it may be determined that one type of interface agent may enable an interface between a sintered object and a support structure to have a break resistance in the region of 50N/cm² when used to provide an interface between an object and a support structure.

Figure 5B:
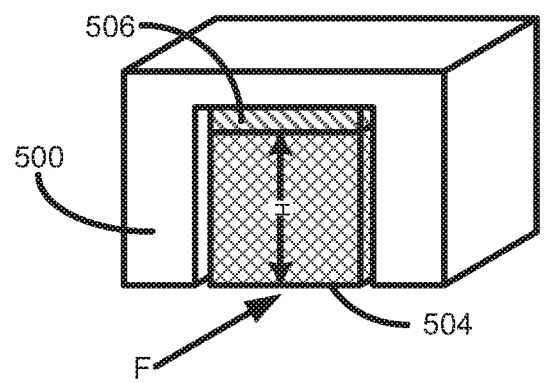

As illustrated in FIG. 5B, using the interface agent characteristics 108, the support structure generator 400 designs a support structure 504 to support the identified portion 502 and generates an interface 506 between the object 500 and the support structure 504. For clarity, the interface 506 is not shown to scale. For example, the interface 506 may be generated using a small number of layers of build material, and may thus have a height which is less than about 1 mm in some examples. In one example, the interface 506 may have a height of less than 0.5 mm. The generated support structure 504 has a height H and the base of the support structure 504 is designed to be in the same plane as the base of the object 500. In other examples, however, the support structure may be designed to be shorter with a shorter height, such that the base of the support structure is not in the same plane as the base of the object 500.

For clarity in the accompanying drawings the objects are shown in white, the support structures are shown with cross-hatching, and the interfaces are shown with hatching. It is to be noted, however, that the build material used in a 3D printer to generate the object and the support structure is the same. Thus, the composition of an object and a support structure is the same. The interface may also be generated from the same build material, but may in some examples, depending on the type of interface agent used, have a modified composition.

In one example, it may be intended that the support structure 504 be removed from a sintered object by applying a predetermined shear force F in a predetermined direction, at the base of the support structure. In one example, as illustrated in FIG. 5B, the predetermined direction may be in a plane generally parallel to the base of the object. The intended strength of the interface 506 may, therefore, be determined by the support structure generator 400 which may then determine the design of the interface such that, once sintered, the support structure may be removed by applying the predetermined force thereto. In one example, the design of the interface may include determining the surface area of the interface that will result in the intended strength. In one example, the design of the interface may include taking into consideration the height of the support structure (in other words, the length of the support structure between the point at which the predetermined force is intended to be applied and the interface).

Figure 6A:
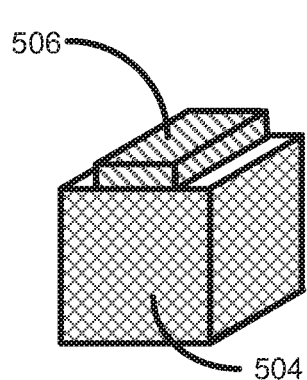
FIG. 6 shows illustrations of a support structure and interface according an example.
Figure 6B:
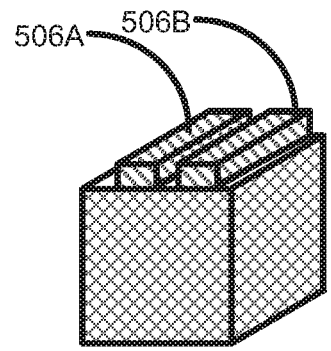

In a first example, shown in FIG. 6A, the support structure generator 400 has determined, based on the height of the support structure 504, a suitable surface area of the interface 506 that will provide the intended strength. As shown in FIG. 6A, the surface area of the interface 506 may be different to the cross-section area of the support structure. In a further example, illustrated in FIG. 6B, the surface area of the interface may be provided by two or more separate interface structures 506A and 506B. In examples, the surface area of different ones of a plurality of interface structures may be different, providing that the overall surface area generally corresponds to the determined surface area.

Although the examples shown in FIG. 6A show an interface having a rectangular cross-section, in other example the support structure generator may generate an interface having a different kind of shape. For example, an interface may comprise a checker-board type patterning, a polygonal cross-section, a curved cross-section, or any other suitable shape.

In one example, the interface may be formed from a more complex geometry that encapsulates build material on which neither interface agent nor binder agent is applied. In such cases, the interface may be designed to provide drain holes to allow non-bound build material to be removed prior to the green part being sintered.

In further examples, the interface may lie generally parallel to the base of the portion of the object which the corresponding support structure is to support. In such examples, the interface may follow the shape of the object, and thus may not lie parallel to a single plane.

In one example the design of the interface may include determining the height of at least a portion of the interface. For example, if it is determined that an interface between a sintered object and a support structure is to have a break resistance in the region of 50N/cm², the support structure generator may determine, based on the above-mentioned interface agent characteristics, both a surface area and a height of the interface in order to provide an interface having the determined break resistance.

At block 408, once the design of the support structure and interface has been determined the object model 104 is modified to add the determined support structure and interface to the object model, thereby generating a modified object model 110. The modified object model 110 defines the object, support, and interface in such a way that it may be used by a 3D printer, such as the 3D printer 300, to generate a green part comprising an object, a support structure and an interface between the support structure and the object such that, after sintering, the support structure may be removed by applying an intended force thereto. As previously described, the modified 3D object model 110 may be transformed into data to control a 3D printer to generate the object and support structures by applying a binder agent to portions of a layer of build material, and to generate the interfaces by applying one either an interface agent, or a combination of interface agent and binder agent.

In a further example, where the support structure generator 100 determines that multiple support structures are to be generated, the support structure generator 100 designs each interface to allow, after sintering, each support structure to be removed with the same predetermined force applied towards the base of each support structure.

Figure 7:
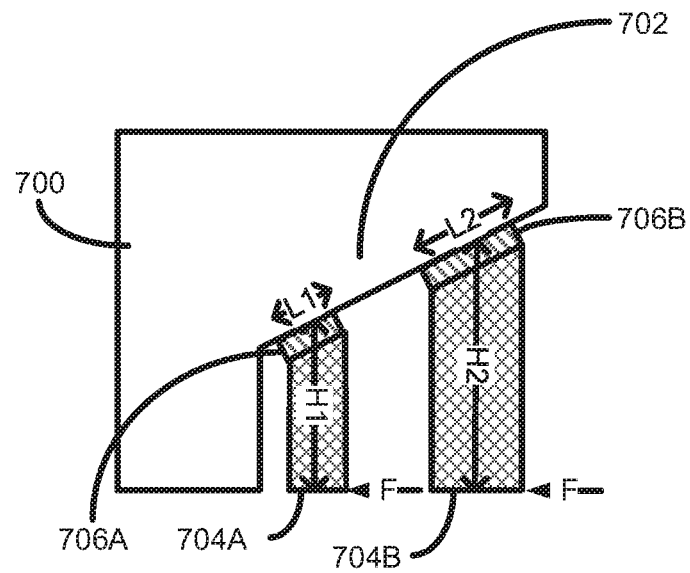
FIG. 7 is a cross-sectional illustration of an object model, support structures, and interfaces according to an example.

Referring now to FIG. 7, there is illustrated a cross-section of an object model of an object 700. The object 700 has an inclined and not-supported portion 702 that is identified by the support structure generator 100 as requiring support during a sintering phase. In this example, the support structure generator 100 has determined that two support structures 704A and 704B should be added to the object model. As can be seen, the first support structure 704A has a first height $H_1$, and the second support structure 704B has a second height $H_2$. In order for both support structures 704 to be removable through application of a similar force F at their respective bases, and taking into account leverage related to the height of support structures, the interface 706A of the first support structure 704A has a smaller surface area than the interface 706B of the second support structure 704B. Accordingly, the interface 706B has a greater removal strength than the interface 706A. However, due to the greater height of the support structure 704B, the force required to be applied at the base of each of the support structures to remove them is substantially the same.

Figure 8:
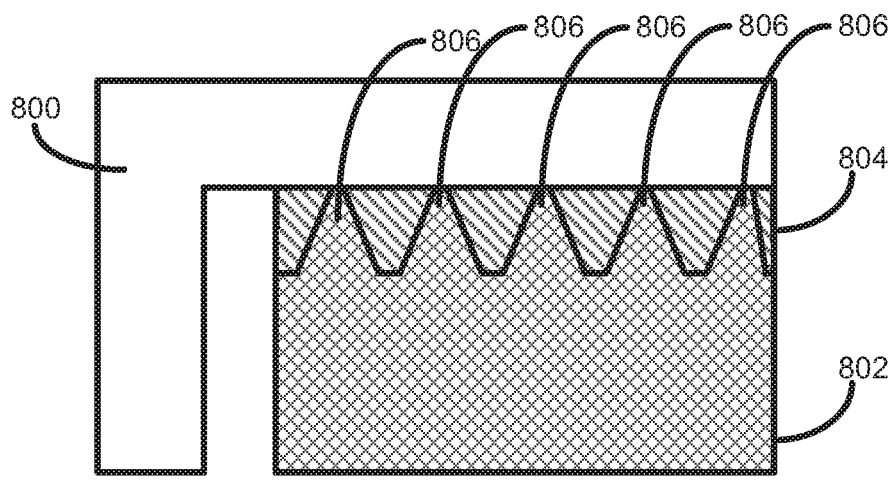
FIG. 8 is a cross-section illustration of an object model, support structure, and interface according to an example.

Referring now to FIG. 8, there is a shown, in a cross-sectional view, a further example of more complex interface 804 between an object 800 and a support structure 802. In this example, it can be seen that the support structure 802 is not completely separated from the object 800 as small volumes 806 of support structure 802 are directly linked to the object 800. Upon removal of the support structure 802 from the sintered object 800, small portions of support structure regions 806 may remain on the object 800. Such portions may, for example, be removed during a post-processing operation such as bead blasting. The use of such an interface that is formed of both a portion of build material on which an interface agent has been applied, and a portion of build material on which no, or little interface agent has been applied may be useful where the strength of the interface is to be higher than can be achieved using the interface agent alone. This may, for example, be used when a relatively thin and relatively long support structure is added.

Figure 9:
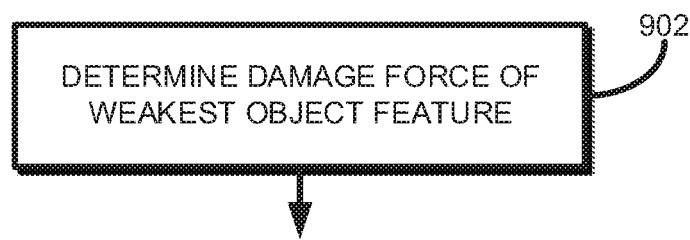
FIG. 9 is a flow diagram outlining a method of operating a support structure generator according to an example.

In a further example, illustrated at block 902 in FIG. 9, the support structure generator 100, may additionally estimate the minimum 'damage force' that would be required to damage the most fragile features of an object generated from the object model. This may take into account, for example, the geometry of such features, the length of such features, the intended build material, etc. The minimum 'damage force' may, for example, take into account leverage, for example to determine the minimum force that may be applied to an object feature, such as at the extremity of an object feature, to cause damage to such a feature. Once the minimum damage force has been determined, the support structure generator, for example as illustrated in block 408 of FIG. 4, may set the maximum support structure release force to be a predetermined amount lower than the minimum damage force.

Designing the maximum support structure release force to be lower than the minimum damage force may enable improved automation of support structure removal without damaging fragile features of a sintered object. For example, a support structure removal tool, such as a brush or a comb, may be used that exerts a force lower than the minimum damage force. Support structures may thus be removed from a sintered object by brushing or combing a sintered object to remove the support structures without damaging fragile features of the sintered object.

In a further example, the printer controller 318 of the 3D printer 300 illustrated in FIG. 3 may comprise the support structure generator 100 illustrated in FIGS. 1 and 2. In this way, the 3D printer 300 may receive a 3D object model to be printed, and may automatically analyse the 3D object model to add appropriate support structures and interfaces as described above.

An Example Interface Agent

An example interface agent suitable for generating removable supports structures as described herein may be a gas generating liquid functional agent. Some examples of the gas generating liquid functional agent are used with a separate binder agent; and other examples of the gas generating liquid functional agent are a combined agent that includes the binder, and thus are not used with a separate binder agent.

Whether a separate agent or a combined agent, in some examples, the gas generating liquid functional agents disclosed herein are aqueous (i.e., water) based liquids including a gas precursor compound(s). In other examples, the gas generating liquid functional agents disclosed herein are solvent based liquids including the gas precursor compound(s).

The gas precursor includes a compound that is to be activated, at a temperature within the sintering temperature range (of a build material), to generate gas pockets within the build material that is patterned with the gas generating liquid functional agent. The gas precursor compound(s) is selected such that it undergoes reaction(s) to initiate gas formation at the high temperatures used in the sintering stage(s) of the printing process. In the examples disclosed herein, the build material support structure is patterned with the gas generating liquid functional agent, and as a result of the gas generation, a mechanically weak, irreversibly breakable 3D support structure is formed. The high activation temperature property of the gas precursor limits the type of gas precursor compounds that are capable of producing the mechanically weak sintered support structure. In the examples disclosed herein, the gas precursor compound(s) may undergo thermal decomposition or oxidation when exposed to temperature(s) within a sintering temperature range of the printing process.

In an example, the gas precursor is selected from the group consisting of a transition metal hydride, an alkaline earth carbonate that releases carbon dioxide when activated, and a solid state mixture of an oxidizable species and an oxidizing agent to produce an oxidation product in a gas state at a sintering temperature used during the heating.

Some examples of the gas precursor compound(s) include inorganic materials that produce gas through thermal decomposition. Suitable inorganic materials include the transition metal hydrides (for example, titanium hydride, $TiH_{(2-x)}$) and the alkaline earth carbonates (for example, calcium carbonate, barium carbonate, strontium carbonate).

At temperatures between about 300° C. to about 500° C., titanium hydride decomposes slowly, releasing hydrogen. Given its non-stoichiometric nature, however, its rate of decomposition increases with further increase in temperature until the melting temperature of metallic titanium is reached. Thus, titanium hydride can be used as a gas precursor compound when it is desirable to form gas pockets at a temperature range of from about 400° C. to about 900° C. Titanium hydride may be a suitable gas precursor compound with an aluminum build material. Titanium hydride is hydrolytically stable, and thus can be readily incorporated into the aqueous based agents disclosed herein.

Alkaline earth carbonates decompose releasing carbon dioxide ($CO_2$) at elevated temperatures. In other words, the gas precursor is an alkaline earth carbonate that releases $CO_2$ when activated. Examples of the alkaline earth carbonates that may be suitable gas precursor compound(s) include calcium carbonate (which thermally decomposes at about 840° C.), barium carbonate (which thermally decomposes at about 1,360° C.), strontium carbonate (which thermally decomposes at temperatures ranging from about 1,100° C. up to about 1,500° C. In an example, the alkaline earth carbonate has a particle size less than 100 nm. A greater $CO_2$ concentration in the atmosphere during thermal decomposition can increase the carbonate decomposition temperature. As such, it may be desirable for alkaline earth carbonate decomposition to take place in an inert, reducing, or vacuum environment.

Some other examples of the gas precursor compound(s) include materials that produce gas through oxidation. Examples of these materials include solid state mixtures of oxidizable species with oxidizing agents. Components for the solid state mixtures are chosen such that i) the gas forming redox reactions in the mixtures are activated at the sintering temperatures of the metal part, and ii) the reducing and oxidizing components in the mixtures are present in stoichiometric ratio, thereby enabling a maximum yield of gas produced by the redox reaction. In examples of the solid state mixtures, the oxidizable species includes carbon particles and the oxidizing agent is a transition metal oxide selected from the group consisting of $Fe_2O_3$ (iron (III) oxide), $Mn_2O_3$ (manganese (III) oxide), $Cr_2O_3$ (chromium (III) oxide), $Co_3O_4$ (cobalt (II, III) oxide), etc. The gas produced from such oxides may include the carbon oxide gases, carbon dioxide ($CO_2$) and carbon monoxide (CO). The gas production from such oxides may proceed according to the scheme illustrated in equations I to IV below:

$$2Me_2O_3 + 3C \rightarrow 4Me + 3CO_2 \qquad (I)$$

$$2Me_2O_3 + 3C \rightarrow 4Me + 6CO \qquad (II)$$

$$Me_3O_4 + 2C \rightarrow 3Me + 2CO_2 \qquad (III)$$

$$Me_3O_4 + 4C \rightarrow 3Me + 4CO \qquad (IV)$$

where Me represents metal. When ferrous oxides are used in the reactions above, the reactions proceed with rates and yield at temperatures typically higher than about 900° C. to about 1000° C., which overlaps with the temperature range used for the sintering of ferrous alloy powders.

The gas precursor compound may be present in the gas generating liquid functional agent in an amount ranging from about 1 wt % to about 75 wt % of the total weight of the gas generating liquid functional agent. In another example, the gas precursor compound may be present in the gas generating liquid functional agent in an amount ranging from about 2 wt % to about 40 wt % or about 50 wt % of the total weight of the gas generating liquid functional agent. These percentages may include both active gas precursor compound and other non-active components present with the compound. It is to be understood that the upper limit may be increased as long as the gas generating liquid functional agent can be jetted via a desired inkjet printhead.

When the gas generating liquid functional agent is used with a separate binder agent, the gas generating liquid functional agent may include the previously described compound (i.e., gas precursor compound), any of a surfactant or a dispersing aid, a co-solvent, and a balance of water. The separate gas generating liquid functional agent may also include antimicrobial agent(s) and/or anti-kogation agent(s), but does not include a binder.

The co-solvent may be an organic co-solvent present in the gas generating liquid functional agent in an amount ranging from about 0.5 wt % to about 50 wt % (based on the total weight of the gas generating liquid functional agent). It is to be understood that other amounts outside of this range may also be used depending, at least in part, on the jetting architecture used to dispense the gas generating liquid functional agent. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the gas generating liquid functional agent may include 2-pyrrolidone, 1,2-butanediol, 2-methyl-1,3-propanediol, 1-(2-hydroxyethyl)-2-pyrrolidone, or combinations thereof.

The gas generating liquid functional agent may also include surfactant(s) and/or dispersing aid(s). Surfactant(s)

and/or dispersing aid(s) may be used to improve the wetting properties and the jettability of the gas generating liquid functional agent. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) in the gas generating liquid functional agent may range from about 0.1 wt % to about 6 wt % based on the total weight of the gas generating liquid functional agent.

The gas generating liquid functional agent may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the gas generating liquid functional agent may include a total amount of antimicrobial agents that ranges from about 0.01 wt % to about 1 wt %. In an example, the antimicrobial agent is a biocide and is present in the gas generating liquid functional agent in an amount of about 0.1 wt % (based on the total weight of the gas generating liquid functional agent). These percentages may include both active antimicrobial agent and other non-active components present with the antimicrobial agent.

An anti-kogation agent may also be included in the gas generating liquid functional agent. Kogation refers to the deposit of dried solids on a heating element of a thermal inkjet printhead. Anti-kogation agent(s) is/are included to assist in preventing the buildup of kogation, and thus may be included when the gas generating liquid functional agent is to be dispensed using a thermal inkjet printhead. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the gas generating liquid functional agent in an amount ranging from about 0.1 wt % to about 1 wt % of the total weight of the gas generating liquid functional agent.

In some examples, the balance of the gas generating liquid functional agent is water (e.g., deionized water). In these examples, the amount of water may vary depending upon the weight percent of the other gas generating liquid functional agent components. In other examples, the balance of the gas generating liquid functional agent is a solvent (e.g., any of the previously listed co-solvent(s).

An example formulation of the gas generating liquid functional agent that does not include a binder, and thus may be used in combination with a separate binder agent, is shown in Table 1. This example includes calcium carbonate as the gas precursor compound.

TABLE 1

| Component Type | Specific Components | Actives (wt %) | Target (wt %) | Formulation (wt %) |
|---|---|---|---|---|
| Co-solvent | 1-(2-Hydroxyethyl)-2-pyrrolidone (HE-2P) | 100.00 | 20.00 | 20.00 |
| Surfactant/Dispersing aid | Silquest ™ Momentive A-1230 | 100.00 | 5.00 | 5.00 |
|  | Surfynol ® 465 | 100.00 | 0.40 | 0.40 |
| Antimicrobial | Acticide ® M20 (stock solution) | 10.00 | 0.01 | 0.10 |
| Gas Precursor Compound | Calcium carbonate ($CaCO_3$) 50 nm-100 nm dispersion | 32.00 | 20.00 | 62.50 |
| Water | Deionized Water | — | — | Balance |

As mentioned herein, other examples of the gas generating liquid functional agent are combined agents that may be used to pattern build material to form the build material support structure without using a separate binder agent. In these other examples, the gas generating liquid functional agent (or combined agent) includes the binder, the gas precursor, water or a solvent, co-solvent(s), and surfactant(s) and/or dispersing aid(s), and in some instances, may also include antimicrobial agent(s) and/or anti-kogation agent(s). In these examples, any of the previously described gas precursors, co-solvent(s), surfactant(s) and/or dispersing aid(s), antimicrobial agent(s), and/or anti-kogation agent(s) may be used in any of the given amounts.

Examples of suitable binders include latexes (i.e., an aqueous dispersion of polymer particles), polyvinyl alcohol, polyvinylpyrrolidone, and combinations thereof.

Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

The polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder agent 14, while the hydrophobic component is capable of coalescing upon exposure to heat in order to temporarily bind the host metal particles 15.

The polymer particles of the latex may have several different morphologies. The polymer particles may include two different copolymer compositions, which may be fully separated core-shell polymers, partially occluded mixtures, or intimately comingled as a polymer solution. In an example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer particles may include 2, 3, or 4 or more relatively large particles that are at least partially attached to one another or that surround a smaller polymer core. The polymer particles of the latex may have a single phase morphology, may be partially occluded, may be multiple-lobed, or may include any combination of any of the morphologies disclosed herein.

The latex polymer particles may have a weight average molecular weight ranging from about 5,000 to about 500,000. As examples, the weight average molecular weight of the latex particles may range from about 10,000 to about 500,000, from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. As used herein, typical ambient conditions include a temperature range from about 20° C. to about 25° C., an atmospheric pressure of about 100 kPa (kilopascals), and a relative humidity ranging from about 30% to about 90%. The glass transition temperature of the latex particles may range from about −20° C. to about 130° C., or in a specific example, from about 60° C. to about 105° C.

Examples of monomers that may be used to form the hydrophobic component include low $T_g$ monomers. Some examples include $C_4$ to $C_5$ alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a HITENOL® compound e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

The polymer particles may have a particle size that can be jetted via thermal inkjet printing or piezoelectric printing or continuous inkjet printing. In an example, the particle size of the polymer particles ranges from about 10 nm to about 300 nm.

Any suitable polymerization process may be used. In examples, the aqueous dispersion of polymer particles (latexes) may be produced by emulsion polymerization or co-polymerization of any of the previously listed monomers.

In an example, the polymer particles may be prepared by polymerizing high $T_g$ hydrophilic monomers to form the high $T_g$ hydrophilic component and attaching the high $T_g$ hydrophilic component onto the surface of the low $T_g$ hydrophobic component.

In another example, each of the polymer particles may be prepared by polymerizing the low $T_g$ hydrophobic monomers and the high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic monomers may dissolve in the hard high $T_g$ hydrophilic monomers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component.

Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The low $T_g$ hydrophobic monomers and/or the high $T_g$ hydrophilic monomers used in any of these example methods may be any of the low $T_g$ hydrophobic monomers and/or the high $T_g$ hydrophilic monomers (respectively) listed above. In an example, the low $T_g$ hydrophobic monomers are selected from the group consisting of $C_4$ to $C_8$ alkyl acrylate monomers, $C_4$ to $C_8$ alkyl I methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, $C_1$ to $C_2$ alkyl acrylate monomers, $C_1$ to $C_2$ alkyl methacrylate monomers, and combinations thereof.

The resulting polymer particles may exhibit a core-shell structure, a mixed or intermingled polymeric structure, or some other morphology.

In some examples, the polymer particles have a MFFT or a glass transition temperature ($T_g$) that is greater (e.g., >) than ambient temperature. In other examples, the polymer particles have a MFFT or $T_g$ that is much greater (e.g., >>) than ambient temperature (i.e., at least 15° higher than ambient). As mentioned herein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the $T_g$ of the bulk material (e.g., the more hydrophobic portion) of the polymer particles may range from 25° C. to about 125° C. In an example, the MFFT or the $T_g$ of the bulk material (e.g., the more hydrophobic portion) of the polymer particles is about 40° C. or higher. The MFFT or the $T_g$ of the bulk material may be any temperature that enables the polymer particles to be inkjet printed without becoming too soft at the printer operating temperatures.

The polymer particles may have a MFFT or $T_g$ ranging from about 125° C. to about 200° C. In an example, the polymer particles may have a MFFT or $T_g$ of about 160° C.

In an example, the binder is present in the combined agent in an amount ranging from about 1 wt % to about 30 wt % based on a total weight of the combined agent. In another example, the binder is present in the combined agent in an amount ranging from about 2 wt % to about 25 wt % based on the total weight of combined agent. As shown in Table 2 below, these percentages may include both active binder and other non-active components present with the binder. Active binder, for example, may be in the range of, e.g., about 1 wt % and about 15 wt %.

In examples of the combined agent, it is desirable that the total volume fraction of solids be about 50 vol. % or less, so that the combined agent is jettable via the desired inkjet printhead (e.g., thermal inkjet printhead, piezoelectric inkjet printhead, etc.). As such, the volume fraction of the gas precursor compound and the binder may be adjusted so that together, the components do not exceed, for example, from about 40 vol. % to about 50 vol. % of the total volume of the combined agent.

An example formulation of the gas generating liquid functional agent that does include a binder, and thus may be used without a separate binder agent, is shown in Table 2. This example includes calcium carbonate as the gas precursor compound.

TABLE 2

| Component Type | Specific Components | Actives (wt %) | Target (wt %) | Formulation (wt %) |
|---|---|---|---|---|
| Co-solvent | 2-methyl-1,3-propanediol | 99.00 | 9.60 | 9.70 |
|  | 2-pyrrolidinone | 95.00 | 17.00 | 17.89 |
| Surfactant/ Dispersing aid | Tergitol ® 15-S-7 | 100.00 | 0.90 | 0.90 |
| Antimicrobial | Acticide ® M20 (stock solution) | 10.00 | 0.01 | 0.10 |

TABLE 2-continued

| Component Type | Specific Components | Actives (wt %) | Target (wt %) | Formulation (wt %) |
|---|---|---|---|---|
| Gas Precursor Compound | Calcium carbonate (CaCO$_3$) 50 nm-100 nm dispersion | 32.00 | 15.00 | 46.88 |
| Binder | Acrylic latex dispersion | 41.40 | 9.00 | 21.74 |
| Water | Deionized Water | — | — | 2.79 |

An Example Binder Agent

A binder agent, or binding liquid functional agent, may be used to pattern build material where it is desirable to form the 3D object. The binder agent may also be used in combination with examples of the gas generating liquid functional agent that do not include a binder to pattern build material where it is desirable to form the build material support structure.

The binder agent includes the binder. Any of the binders set forth herein for examples of the combined agent may be used in the binder agent. In an example, the binder is present in the binder agent in an amount ranging from about 1 wt % to about 30 wt % based on a total weight of the binder agent. In another example, the binder is present in the binder agent in an amount ranging from about 2 wt % to about 20 wt % based on the total weight of binder agent. These percentages may include active binder, and the percentages may be higher when other non-active components are considered (e.g., in Table 3).

In addition to the binder, the binder agent may also include water, co-solvent(s), surfactant(s) and/or dispersing aid(s), antimicrobial agent(s), and/or anti-kogation agent(s). In these examples, any of the previously described co-solvent(s), surfactant(s) and/or dispersing aid(s), antimicrobial agent(s), and/or anti-kogation agent(s) may be used in any of the given amounts, except that the weight percentages are with respect to a total weight of the binder agent.

The composition of the binding liquid functional agent is similar to examples of the gas generating liquid functional agent except that the gas precursor compound(s) is excluded from the formulation of the binding liquid functional agent.

An example formulation of the binding liquid functional agent is shown in Table 3.

TABLE 3

| Component Type | Components | Actives (wt %) | Target (wt %) | Formulation (wt %) |
|---|---|---|---|---|
| Co-solvent | 2-methyl-1,3-propanediol | 99.00 | 9.60 | 9.70 |
| | 2-pyrrolidinone | 95.00 | 17.00 | 17.89 |
| Surfactant/ Dispersing aid | Tergitol ® 15-S-7 | 100.00 | 0.90 | 0.90 |
| Antimicrobial | Acticide ® M20 (stock solution) | 10.00 | 0.01 | 0.1 |
| Binder | Acrylic latex dispersion | 41.40 | 16.00 | 38.65 |
| Water | Deionized Water | — | — | Balance |

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples described herein may be conveyed electronically via any medium such as a communication signal carried over a wired or wireless connection.

All the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

Example implementations can be realized according to any one or more of the following clauses:

Clause 1: A method of processing a 3D model of an object to be generated as a green printed object with a powder-based 3D printer; comprising: obtaining a 3D model defining a 3D object; obtaining characteristics of an interface agent to be used by a 3D printer for forming an interface layer between a portion of the printed object and a printed support structure; modifying the 3D model to add a support structure connected to a portion of the object via an interface, the object, support structure, and interface to be formed by selective application of a binder agent and the interface agent on successive layers of a powder by a 3D printer based on the 3D model, the support structure to provide physical support of the green printed object during a post-printing sintering operation; and creating the interface in the 3D model, based on the obtained characteristics, such that after sintering of the green printed object the sintered support structure can be released from the sintered object at the interface layer with a predetermined force.

Clause 2: The method of clause 1, wherein modifying the 3D model comprises modifying the 3D model to add a plurality of support structures each connected to a portion of the object via respective interfaces, and wherein creating the interfaces in the 3D model comprises creating the interfaces such that, after sintering, each of the sintered support structures can be removed from the sintered object with a similar predetermined force.

Clause 3: The method of clause 1 or 2, wherein creating the interface comprises determining the strength of the interface based on one or more of: characteristics of the interface agent; the length of the support structure; a direction in which the predetermined force is intended to be applied; and the location on the support structure at which the predetermined force is intended to be applied.

Clause 4: The method of clause 1, 2, or 3, wherein creating the interface comprises determining the strength of the interface based on a predetermined force that is within a predetermined range of the predetermined force.

Clause 5: The method of any preceding clause, further comprising determining from the object model an estimated force that would cause damage if applied to features of an object generated using the object model, and wherein the predetermined force to remove a support structure is set to be a predetermined amount lower than the estimated force.

Clause 6: The method of any preceding clause, further comprising generating a green 3D printed object using the modified object model.

Clause 7: The method of clause 6, further comprising causing the 3D printer to generate portions of the model that define a portion of an object or a support structure by causing the 3D printer to selectively apply a binder agent to portions of a layer of build material, and causing the 3D printer to generate portions of the object model that define a portion of an interface by causing the 3D printer to apply at least an interface agent to portions of a layer of build material.

Clause 8: The method of clause 6 or 7, further comprising sintering the green part to cause the interface between the object and any support structures to be formed with the predetermined release force.

Clause 9: The method any preceding clause, wherein modifying the 3D model to add a support structure comprising adding multiple support structures, and wherein the interface of each support structure is designed to allow, after sintering, each support structure to be removed with the same predetermined force applied towards the base of each support structure.

Clause 10: The method of clause 8 or 9, further comprising removing any support structures from the sintered object using a tool having elements having a predetermined resistance greater than the predetermined release force.

Clause 11: A non-transitory computer readable storage medium comprising instructions that, when executed by a processor, cause the processor to: obtain an object model; analyse the object model; obtain characteristics of an interface agent; generate a modified object model comprising a support structure and an interface between the support structure and the object, the interface being such that after generation of a 3D printed green part and after sintering thereof, the support structure may be released with a predetermined force; and controlling a 3D printer to generate a 3D printed green part based on the modified object model Clause 12: The non-transitory computer readable storage medium of clause 11, further comprising generating a modified object model comprising a plurality of support structures and corresponding interfaces such that, after sintering, each of the support structures can be removed with a similar predetermined force.

Clause 13: The non-transitory computer readable storage medium of clause 11 or 12, further comprising generating each interface based on one or more of: characteristics of an interface agent; the length of the support structure; a direction in which the predetermined force is to be applied; and the location on the support structure at which the predetermined force is to be applied.

Clause 14: The non-transitory computer readable storage medium of clause 11, 12, or 13, further comprising determining a damage force that would cause damage to a feature of the object, and setting the predetermined force to release a support structure to be below the determined damage force.

Clause 15: A 3D printer comprising: a layering system to form a layer of build material on a build platform; a binder agent distributor to selectively apply a binder agent on a formed layer of build material; an interface agent distributor to selectively apply an interface agent on a formed layer of build material; a printer controller to: modify a received object model to add a support structure and interface between the support structure; generate the object, support structure, and interface by selectively applying one of the binder agent and the interface agent based on the modified object model such that, after sintering of the generated object, the support structure is releasable from object by applying a predetermined force.

The invention claimed is:

1. A method comprising:
obtaining the 3D a three-dimensional (3D) model defining a 3D object;
obtaining a characteristic of an interface agent to be used by a 3D printer for forming an interface between a portion of a green printed object and a support structure;
modifying the 3D model to add a representation of the support structure that when formed by the 3D printer connects to a portion of the green printed object via the interface, the green printed object, the support structure, and the interface to be formed by selective application of a binder agent and the interface agent on successive layers of a powder by the 3D printer based on the modified 3D model, the support structure to provide physical support of the green printed object during a post-printing sintering operation;
creating a representation of the interface in the modified 3D model, based on the obtained characteristic, such that, after sintering of the green printed object and the support structure, the sintered support structure is releasable from the sintered green printed object at the interface with a predetermined force, wherein the creating of the representation of the interface in the modified 3D model comprises obtaining a height of the support structure and determining a surface area of the interface and a height of the interface based on the height of the support structure to achieve a target break resistance; and
controlling the 3D printer to form the green printed object, the interface, and the support structure based on the modified 3D model.

2. The method of claim 1, wherein the modifying of the 3D model comprises modifying the 3D model to add representations of a plurality of support structures each connected to a portion of the green printed object via respective interfaces, the method comprising:

creating representations of the interfaces in the 3D model such that, after sintering of the green printed object and the plurality of support structures, each of the sintered plurality of support structures can be removed from the sintered green printed object with the predetermined force.

3. The method of claim 1, wherein the creating of the representation of the interface in the modified 3D model comprises determining a strength of the interface based on one or more of: the characteristic of the interface agent; a length of the support structure; a direction in which the predetermined force is to be applied; and a location on the support structure at which the predetermined force is to be applied.

4. The method of claim 1, wherein the creating of the representation of the interface in the modified 3D model comprises determining a strength of the interface based on the predetermined force.

5. The method of claim 1, further comprising determining from the 3D model an estimated force that would cause damage if applied to features of the 3D object generated using the 3D model, and wherein the predetermined force to remove the support structure is set to be a predetermined amount lower than the estimated force.

6. The method of claim 1, further comprising generating, by the 3D printer, the green printed object, the interface, and the support structure using the modified 3D model.

7. The method of claim 6, further comprising sintering the green printed object, the interface, and the support structure to cause the interface between the green printed object and the support structure to be formed with a release force that is the predetermined force.

8. The method of claim 7, further comprising removing the sintered support structure from the sintered green printed object using a tool having elements having a predetermined resistance greater than the predetermined force.

9. The method of claim 1, further comprising:
causing the 3D printer to generate a portion of the green printed object or the support structure by causing the 3D printer to selectively apply the binder agent to portions of a layer of build material; and
causing the 3D printer to generate a portion of the interface by causing the 3D printer to apply the interface agent to portions of the layer of build material.

10. The method of claim 1, wherein the interface agent comprises a liquid including a gas precursor.

11. A non-transitory computer readable storage medium comprising instructions that, when executed, cause a system to:
receive a three-dimensional (3D) model representing a 3D object;
receive a characteristic of an interface agent to be used by a 3D printer for forming an interface between a portion of a green printed object and a support structure;
modify the 3D model to generate a modified 3D model, the modifying comprising:
adding, to the 3D model, a representation of the support structure that when formed by the 3D printer connects to a portion of the green printed object via the interface, the green printed object, the support structure, and the interface to be formed by selective application of a binder agent and the interface agent on successive layers of a powder by the 3D printer based on the modified 3D model, the support structure to provide physical support of the green printed object during a post-printing sintering operation, and adding, to the 3D model, a representation of the interface based on the characteristic of the interface agent, such that, after sintering of the green printed object and the support structure, the sintered support structure is releasable from the sintered green printed object at the interface with a predetermined force, wherein the adding of the representation of the interface to the 3D model comprises obtaining a height of the support structure and determining a surface area of the interface and a height of the interface based on the height of the support structure to achieve a target break resistance; and
control the 3D printer to generate the green printed object, the interface, and the support structure based on the modified 3D model.

12. The non-transitory computer readable storage medium of claim 11, wherein the instructions when executed cause the system to modify the 3D model by adding representations of a plurality of support structures and representations of corresponding interfaces such that, after sintering, each of the plurality of support structures is removable with the predetermined force.

13. The non-transitory computer readable storage medium of claim 12, wherein the instructions when executed cause the system to generate a representation of each interface of the corresponding interfaces based on one or more of:
the characteristic of the interface agent; a length of a corresponding support structure; a direction in which the predetermined force is to be applied; and a location on the corresponding support structure at which the predetermined force is to be applied.

14. The non-transitory computer readable storage medium of claim 13, wherein the instructions when executed cause the system to:
determine a damage force that would cause damage to a feature of the 3D object; and
set the predetermined force to release the support structure to be below the determined damage force.

15. The non-transitory computer readable storage medium of claim 11, wherein the interface agent comprises a liquid including a gas precursor.

16. A three-dimensional (3D) printer comprising:
a layering system to form a layer of a build material on a build platform;
a binder agent distributor to selectively apply a binder agent on a layer of the build material;
an interface agent distributor to selectively apply an interface agent on a layer of the build material; and
a printer controller to:
receive a 3D model representing a 3D object;
receive a characteristic of the interface agent to be used by a 3D printer for forming an interface between a portion of a green printed object and a support structure;
modify the 3D model to generate a modified 3D model, the modifying comprising:
adding, to the 3D model, a representation of the support structure that when formed by the 3D printer connects to a portion of the green printed object via the interface, the green printed object, the support structure, and the interface to be formed by selective application of a binder agent and the interface agent on successive layers of a powder by the 3D printer based on the modified 3D model, the support structure to provide physical support of the green printed object during a post-printing sintering operation, and adding, to the 3D model, a representation of the interface based on the characteristic of the interface agent, such that, after sintering of the green printed object and the support structure, the sintered support structure is releasable from the sintered green printed object at the interface with a predetermined force, wherein the adding of the representation of the interface to the 3D model comprises obtaining a height of the support structure and determining a surface area of the interface and a height of the interface based on the height of the support structure to achieve a target break resistance; and control the 3D printer to generate the green printed object, the interface, and the support structure based on the modified 3D model.

17. The 3D printer of claim 16, wherein the printer controller is to modify the 3D model by adding representations of a plurality of support structures and representations of corresponding interfaces such that, after sintering, each of the plurality of support structures is removable with the predetermined force.

18. The 3D printer of claim 17, wherein the printer controller is to generate a representation of each interface of the corresponding interfaces based on one or more of: the characteristic of the interface agent; a length of a corresponding support structure; a direction in which the predetermined force is to be applied; and a location on the corresponding support structure at which the predetermined force is to be applied.

19. The 3D printer of claim 16, wherein the printer controller is to:

determine a damage force that would cause damage to a feature of the 3D object; and set the predetermined force to release the support structure to be below the determined damage force.

* * * * *